United States Patent Office 3,330,641

Patented July 11, 1967

3,330,641

HERBICIDAL COMPOSITION AND METHOD

William G. Woods, Fullerton, and Robert F. Crawford, La Mirada, Calif., assignors to United States Borax & Chemical Corporation, Los Angeles, Calif., a corporation of Nevada No Drawing. Filed July 11, 1966, Ser. No. 564,050

17 Claims. (Cl. 71—94)

This application is a continuation in part of our co-pending application Ser. No. 396,369 filed Sept. 14, 1964, now U.S. Patent 3,293,257.

This invention relates to novel pyridyl urea compounds and, more particularly, to novel 1,1-dialkyl-3-(pyridyl)-urea compounds and their use as plant growth regulants.

According to the present invention, there are provided plant growth regulant compositions and methods utilizing pyridyl urea compounds of the formula

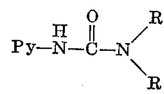

wherein Py is selected from the group consisting of pyridyl and the chloropyridyl groups and R represents lower alkyl. Thus, the pyridyl group can be an alpha, beta or gamma pyridyl radical or the chloro derivatives thereof, and especially those groups having from 1 to about 3 chloro substituents on the pyridyl radical. R can represent the same or different lower alkyl groups such as methyl, ethyl, n-propyl, sec-butyl, n-hexyl and the like.

The compounds of the present invention are normally crystalline solids when pure, which are soluble in the usual organic solvents, as well as having some solubility in water. The compounds are useful as plant growth regulants, and especially as herbicides when applied as either a pre-emergence or post-emergence treatment and may be formulated with the usual herbicide carriers for use in controlling unwanted plants.

The pyridyl ureas can be prepared by reaction of the corresponding aminopyridine with dialkyl carbamoyl chloride in the presence of a tertiary amine, such as pyridine, which acts to neturalize the by-product hydrogen chloride as it is evolved. The reactants are preferably combined in about equimolar proportions at ambient temperatures. For example, the reactants can be combined in the presence of excess pyridine at room temperature in the substantial absence of moisture, and the reaction mixture allowed to react, resulting in a mild exotherm. After the reaction is completed (about 1–3 hours), the desired product is isolated and purified by conventional proceduces, such as recrystallization or distillation under reduced pressure.

Alternatively, the pyridyl urea compounds can be prepared by reaction of a dialkylamine with the corresponding pyridyl isocyanate, which can be prepared in situ by reaction of the aminopyridine with phosgene in toluene.

Typical examples of compounds embraced by the present invention are 1,1-dimethyl-3-($\alpha$-pyridyl)urea
1,1-dimethyl-3-($\gamma$-pyridlyl)urea
1,1-dimethyl-3-(5-chloro-2-pyridyl)urea
1,1-dimethyl-3-($\beta$-pyridyl)urea
1,1-dimethyl-3-(4,6-dichloro-2-pyridyl)urea
1,1-dimethyl-3-(5-chloro-3-pyridyl)urea
1,1-dimethyl-3-(4-chloro-2-pyridyl)urea
1,1-diethyl-3-($\alpha$-pyridyl)urea
1,1-di-n-butyl-3-(5-chloro-2-pyridyl)urea
1,1-dimethyl-3-(2,3,5-trichloro-4-pyridyl)urea
1-methyl-1-butyl-3-($\gamma$-pyridyl)urea
1,1-di-n-hexyl-3-($\beta$-pyridyl)urea The pyridyl ureas of this invention are effective plant growth regulants, useful for controlling plant growth, and especially useful as herbicides for killing weed growth. "Weeds" as used herein is intended to include any plant growth which is undesirable. The compounds are useful as a pre-emergence or post-emergence treatment; that is, they can be used to kill growing plants or they can be used to kill or prevent the emergence of seedlings of the plants. Thus, the compounds can be used to control the growth of weeds by applying a phytotoxic amount to the locus of the weeds, that is, the foliage of the growing plants or soil in which the plants are growing or will grow.

An application rate in the range of from about 1 to about 50 pounds of one or more of the active compounds per acre is generally an effective phytotoxic amount, although greater or lesser amounts can be used if desired. The presently preferred application rate is in the range of from about 3 to about 25 pounds per acre.

The presently pereferred herbicidal compounds are the $\alpha$-pyridyl ureas and chlorinated derivatives thereof, such as the monochloro-, dichloro-, and trichloro-$\alpha$-pyridyl ureas. At low application rates, such as less than about 10 pounds per acre, 1,1-dimethyl-3-(5-chloro-2-pyridyl)-urea is especially useful for controlling weed growth in corn. For example, when the compound is applied as a post-emergence treatment at application rates of from about 2 to 10 pounds per acre, a complete kill of many weeds is obtained without any detrimental effect to corn.

The following examples are presented to illustrate the preparation of and herbicidal activity of typical compounds of this invention, but it is to be understood that the invention is not limited to the specific examples given.

EXAMPLE I

*1,1-dimethyl-3-($\alpha$-pyridyl)urea*

2-aminopyridine (12.8 grams; 0.136 mole) was added to a solution of 15.0 grams (0.139 mole) of dimethyl carbamoyl chloride in 30 ml. of pyridine at ambient temperature. The resulting dark brown solution was treated with 200 ml. of water, and the aqueous mixture filtered to remove insoluble crystalline 1,3-bis-($\alpha$-pyridyl)urea. The filtrate was saturated with sodium chloride, filtered and extracted with four portions of chloroform after basification with ammonium hydroxide. The combined chloroform extracts were dried over sodium sulfate and the solvent removed by distillation. Extraction of the residue with three portions of pentane left 9.5 grams of oil which was distilled through a simple still head and the product, 5.98 grams (26.6%), was collected at 120°–122° C./0.70 mm.; it partially solidified in the condenser. The solid portion of the product fraction was isolated by filtration and pressed on a porous plate to give the dry solid, M.P. 45.5°–49.0° C. After further purification by sublimation at 60° C. and less than 1 mm. pressure, the purified product was obtained as white, waxy crystals, M.P. 44°–47° C.

*Analysis.*—Calculated for $C_8H_{11}N_3O$: C=58.16%, H=6.71%, N=25.44%. Found: C=57.34%, H=6.67%, N=26.20%.

The *picrate* was prepared and melted at 185°–186° C. (d.).

*Analysis.*—Calculated for $C_{14}H_{14}N_6O_8$: C=42.64%, H=3.58%, N=21.31%. Found: C=43.00, 42.70%; H=4.13, 4.31%; N=21.82%.

A methanol solution of the compound was applied as a pre-emergence treatment at a rate of 15 pounds per acre to millet, ryegrass, oats, peas, cucumbers, mustard and snap beans, and gave a complete kill of all plants except mustard, which was severely injured.

EXAMPLE II

*1,1-dimethyl-3-($\beta$-pyridyl)urea*

A solution of 10.0 grams (0.106 mole) of 3-aminopyridine in 150 ml. of ether was added to a solution of 25.5 grams (0.258 mole) of phosgene in 150 ml. of toluene at 0° C. over a 2.5 hour period. After standing overnight, the resulting lavender slurry was freed of ether by distillation, and the toluene slurry was boiled under reflux for 3 hours. After cooling, anhydrous dimethylamine was passed in the toluene solution for 45 minutes. After standing overnight at ambient temperature, the resulting slurry was filtered to remove crude crystalline product (4.2 grams). Additional product crystallized from the toluene filtrate after removal of part of the toluene and was combined with the first fraction for purification. Recrystallization of the crude crystalline material (twice) from cyclohexane-ethyl acetate gave the pure product melting at 124°–125° C.

*Analysis*.—Calculated for $C_8H_{11}N_3O$: C=58.16%, H=6.71%, N=25.44%. Found: C=57.58%, H=6.46%, N=26.05%.

Application of the compound as a methanolic solution at a rate of 22 pounds per acre as a pre-emergence treatment to peas, mustard, cucumbers, and beans gave a complete kill of all plants.

EXAMPLE III

*1,1-dimethyl-3-(γ-pyridyl)urea*

4-aminopyridine (5.0 grams; 0.053 mole) was added to a solution of 7.4 grams (0.069 mole) of dimethyl carbamoyl chloride in 15 ml. of pyridine at ambient temperature. After a slight exotherm, the solution was allowed to stand for 3 days at room temperature to give a thick, yellow slurry. The crystalline solid was isolated by filtration and washed free of pyridine with pentane. After crystallization from ethanol-cyclohexane, 7.09 grams melting at 186°–189° C. was obtained. Recrystallization from ethanol-cyclohexane gave the pure product melting at 194°–195° C., which is 1,1-dimethyl-3-(γ-pyridyl)urea hydrochloride.

*Analysis*.—Calculated for $C_8H_{12}ClN_3O$: C=47.65%, H=6.00%, Cl=17.58%, N=20.84%. Found: C=47.84%; H=6.08%; Cl=17.51, 17.77%; N=21.08%.

When an aqueous solution of the hydrochloride was applied as a post-emergence treatment to cucumber, mustard and snap bean plants at a rate of 30 pounds per acre, the plants were stunted significantly but not killed.

EXAMPLE IV

*1,1-dimethyl-3-(5-chloro-2-pyridyl)urea*

Dimethyl carbamoyl chloride (11.0 grams; 0.102 mole) was added to a solution of 12.9 grams (0.100 mole) of 2-amino-5-chloropyridine in 35 ml. of pyridine at ambient temperature. The color of the reaction mixture became red over a 30-minute period during a mild exotherm. After standing at ambient temperature for 2 days, in the absence of any moisture, the reaction mixture was added to 350 ml. of ice water and the resulting slurry basified with 4 N sodium hydroxide solution. Insoluble 1,3-bis-(5-chloro-2-pyridyl)urea was removed by filtration and the filtrate nearly saturated with sodium chloride. The saturated solution was extracted with three 150 ml. portions of chloroform. The combined extracts were dried over sodium sulfate, distilled to dryness and the residue allowed to crystallize in the presence of 50 ml. of n-hexane. The hexane was removed by decantation to leave 8.26 grams of a semi-solid oil, which was fractionally distilled at reduced pressure. After taking lower boiling forecuts, the crude product (2.35 grams) was obtained at B.P. 122°–170° C./1.4–1.5 mm., which solidified in the distillation receiver. Sublimation of the crude product gave some lower melting material and the product which melted at 98°–103° C. After recrystallization from n-hexane, the pure product was obtained as colorless needles, M.P. 107°–109° C.

*Analysis*.—Calculated for $C_8H_{10}ClN_3O$: C=48.13%, H=5.05%, Cl=17.76%, N=21.05%. Found: C=48.25%, H=5.67%, Cl=17.79%, N=21.33%.

A methanol solution of the compound was applied as a post-emergence treatment at the rate of 6.5 pounds per acre to snap beans, cucumbers, mustard, peas, oats and corn. A complete kill of all plants, except corn, was obtained. There was no significant injury to the corn plants.

Since a relatively small amount of one or more of the active pyridyl ureas should be uniformly distributed over the area to be treated, the compounds preferably are formulated with conventional herbicide carriers, either liquid or solid. Thus, the compounds can be impregnated on or admixed with a solid pulverulent carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salts of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5% to about 99% by weight of one or more of the active pyridyl ureas with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant may comprise the carrier in such concentrates.

Since the compounds will form salts with strong acids, such as hydrochloric acid, sulfuric acid, sulfonic acid, and trichloroacetic acid, they can be readily formulated as acid salts in aqueous solution. This provides a facile method of formulating the compound since the salts are water-soluble and are preferred for many applications.

The herbicidal compositions can include other beneficial adjuvants, such as humectants, oils and contact agents. Also, other herbicides, such as sodium chlorate and the sodium borates, the chlorophenoxyacetic acids, trichlorobenzoic acids, substituted ureas, triazines, uracils and carbamates, can be included in the formulations.

The following examples are presented to illustrate the preparation of suitable herbicidal compositions of this invention.

EXAMPLE V

| | Percent |
|---|---|
| 1,1-dimethyl-3-(5-chloro-2-pyridyl)urea | 85 |
| Bentonite clay | 14 |
| Sodium laurylsulfate surfactant | 1 |

A wettable powder formulation can be prepared by micronizing the urea and mixing uniformly with powdered bentonite clay and powdered sodium laurylsulfate. The wettable powder can be added to water or hydrocarbon oil and mechanically agitated to insure a uniform dispersion which can be sprayed with conventional equipment on soil or vegetation.

EXAMPLE VI

| | Percent |
|---|---|
| 1,1-dimethyl-3-(α-pyridyl)urea | 15 |
| Polyoxyethylenesorbitan monolaurate | 2 |
| Isopropanol | 40 |
| Xylene | 43 |

The urea is dissolved in a mixture of isopropanol and xylene to form a concentrated solution. The emulsifying agent is then dissolved and a liquid formulation of an emulsifiable concentrate is obtained. The emulsifiable concentrate can be added to water to dilute to a desired concentration, and then be sprayed with conventional equipment on soil or vegetation.

EXAMPLE VII

| | Percent |
|---|---|
| 1,1-dimethyl-3-(5-chloro-2-pyridyl)urea | 4 |
| Sodium tetraborate pentahydrate | 96 |

Granular sodium tetraborate pentahydrate is dry blended with the powdered urea. Five precent water is added to the blended mixture to adhere the urea to the granular borate and the mixture then air-dried. The granular formulation can be applied by hand or with a mechanical spreader to the soil or on vegetation.

EXAMPLE VIII

| | Percent |
|---|---|
| 1,1-diethyl-3-(α-pyridyl)urea | 5 |
| Sodium chlorate | 35 |
| Sodium metaborate | 60 |

The urea is added to a mixture of borax, sodium hydroxide and sodium chlorate as described in U.S. Patent 3,130,036 and the resultant mixture placed on a drum dryer to give a flaked product of co-crystallized herbicide.

Other modes of applying the principle of the invention may be employed, change being made as regards the details described, provided the features stated in any of the following claims or the equivalent of such be employed.

We, therefore, claim as our invention:

1. A herbicidal composition comprising a phytotoxic amount of a compound of the formula

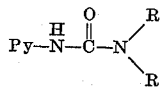

wherein Py is selected from the group consisting of pyridyl and the chloropyridyl groups and R is lower alkyl, and an inert carrier therefor.

2. A herbicidal composition according to claim 1 in which said compound is 1,1-dimethyl-3-(5-chloro-2-pyridyl)urea.

3. A herbicidal composition according to claim 1 in which said compound is 1,1-dimethyl-3-(α-pyridyl)urea.

4. A herbicidal composition according to claim 1 in which said compound is 1,1-dimethyl-3-(β-pyridyl)urea.

5. A composition according to claim 1 in which said compound is in the form of a water-soluble salt and said inert carrier is water.

6. A plant growth regulant composition comprising a herbicidally effective amount of a compound of the formula

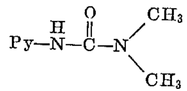

wherein Py is selected from the group consisting of pyridyl and the chloropyridyl groups, a surfactant and an inert carrier therefor.

7. A herbicidal composition comprising a herbicidally effective amount of a compound of the formula

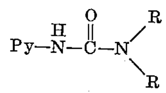

wherein Py is selected from the group consisting of pyridyl and the chloropyridyl groups and R is lower alkyl, and sodium borate.

8. The method of controlling plant growth which comprises applying to the locus of said plants a phytotoxic amount of a compound of the formula

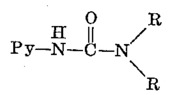

wherein Py is selected from the group consisting of pyridyl and the chloropyridyl groups and R is lower alkyl.

9. The method of claim 8 in which said compound is applied at a rate from about 3 to about 25 pounds per acre.

10. The method of claim 8 in which said compound is applied to the foliage of said plant.

11. The method of claim 8 in which said compound is applied to soil in which said plant grows.

12. The method of claim 8 in which said compound is 1,1-dimethyl-3-(α-pyridyl)urea.

13. The method of claim 8 in which said compound is 1,1-dimethyl-3-(5-chloro-2-pyridyl)urea.

14. The method of claim 8 in which said compound is 1,1-dimethyl-3-(β-pyridyl)urea.

15. The method of controlling weed growth in corn which comprises applying to the locus of said weeds a phytotoxic amount of 1,1-dimethyl-3-(5-chloro-2-pyridyl) urea.

16. A herbicidal composition according to claim 1 in which a surfactant is included.

17. The method according to claim 8 in which Py represents α-pyridyl or a chlorinated derivative thereof.

References Cited

UNITED STATES PATENTS

| | | | |
|---|---|---|---|
| 3,084,192 | 4/1963 | Smathers | 71—2.6 X |
| 3,218,147 | 11/1965 | Homer | 71—2.5 X |

LEWIS GOTTS, *Primary Examiner.*

JAMES O. THOMAS, Jr., *Examiner.*